Sept. 21, 1948.

A. T. COMISKEY, SR

MOTORCYCLE WINDSHIELD

Original Filed May 23, 1945

Re. 23,039

Inventor:
Anthony Thomas Comiskey, Sr.
By: Soans, Pond & Anderson
Attys

Reissued Sept. 21, 1948

Re. 23,039

UNITED STATES PATENT OFFICE 23,039

MOTORCYCLE WINDSHIELD

Anthony Thomas Comiskey, Sr., Chicago, Ill.

Original No. 2,396,493, dated March 12, 1946, Serial No. 595,401, May 23, 1945. Application for reissue February 15, 1947, Serial No. 728,776

9 Claims. (Cl. 296—78.1)

This invention relates to a motorcycle windshield and it is particularly concerned with means for mounting the windshield on the handle bars of the machine.

Windshields for motorcycles have, of course, been long well known. The constructions heretofore known have been such as to require different mounting arrangements for the two classes of handle bars which may be typified as braced and unbraced handle bars.

The object of the present invention is to provide a universal mounting arrangement which will permit the windshield to be mounted interchangeably on both forms of handle bars. It is also an object of the present invention to provide a universal mounting arrangement which will be simple in construction and easy to adapt to the respective types of handle bar constructions and, in general, it is the object of the invention to provide an improved windshield structure of the character indicated.

Other objects and advantages of the invention will be understood by reference to the following specification and accompanying drawing, wherein there is illustrated a selected embodiment of the windshield and its manner of attachment to the indicated two classes of handle bar constructions.

Figure 1:
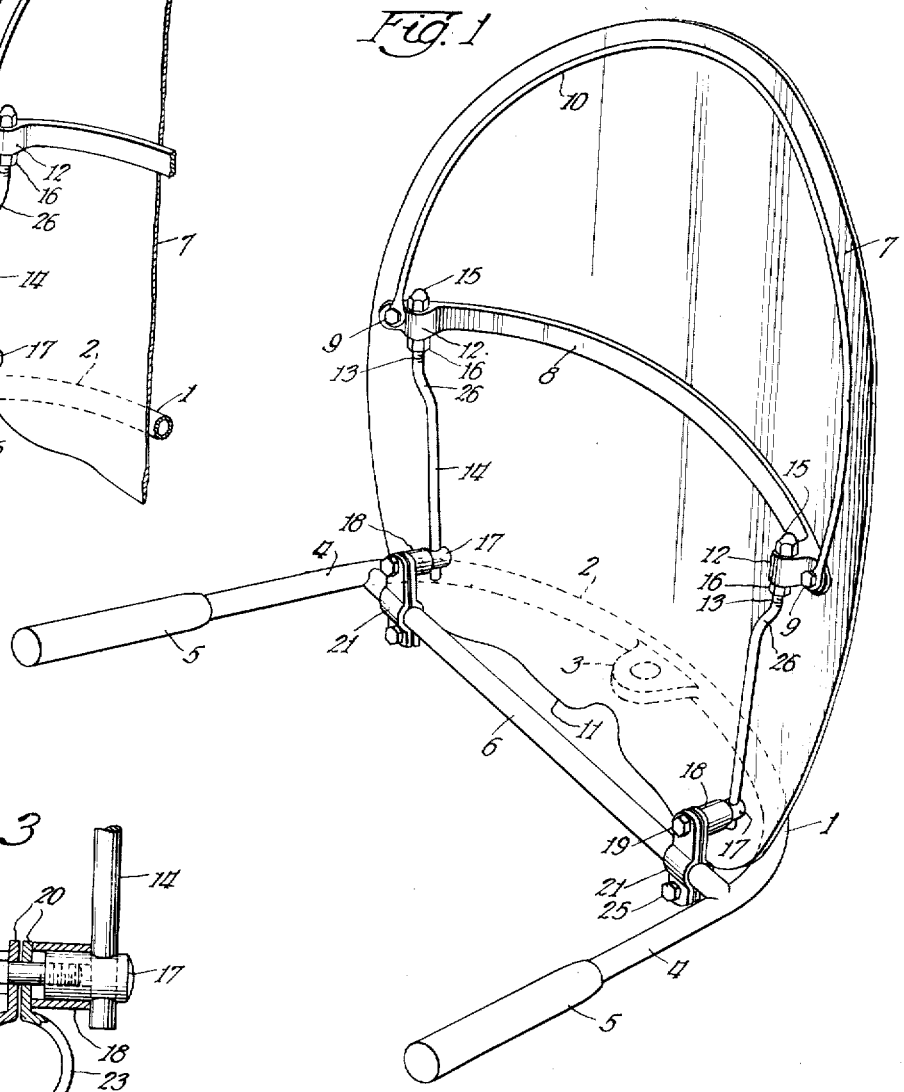
Fig. 1 is a perspective illustrating the windshield attached to a braced type of handle bar structure.
Figure 3:
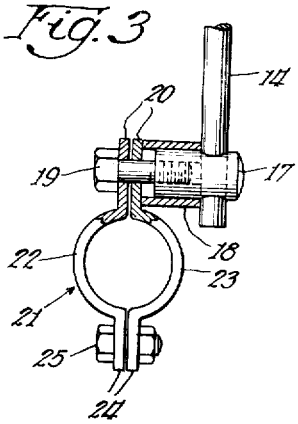
Fig. 3 is a detail illustrating a form of clamp construction employed.

In the drawing, a braced handle bar construction, as shown in Fig. 1, comprises a main tubular member 1 which is bent to more or less U-shape and provided at about the middle of its connecting member 2 with means for securing the handle bar structure to the front wheel fork of the motorcycle. Such attaching means is typified in Fig. 1 by the centrally located apertured lug 3. The side arms 4—4 of the handle bar have their free ends provided with grips 5, usually of rubber or other suitable material.

In the braced form of construction shown in Fig. 1, the side arms 4—4 are additionally connected by a transversely extending tube 6 which has its opposite ends welded to the respective arms 4.

Some makes of motorcycles are equipped with a braced handle bar structure as shown in Fig. 1, while others eliminate the transverse member 6 by making the U-shaped member of tubing which is considered strong enough for handle bar purpose without transverse bracing.

The windshield structure comprises a screen which in this instance embodies a transverse sheet 7 of flexible plastic material which is secured to a suitably arched metal bar or bracing member 8. In this instance attachment is effected by bolts 9—9 which extend through the ends of the arched member 8 and the transparent member 7. Also, an upwardly extending arched rod 10 is welded or otherwise rigidly secured at its lower ends to the end portions of the bar 8 for supporting the upper portion of the windshield member 7.

In the construction shown the transparent member 7 extends both above and below the arched supporting member 8 but in many constructions the transverse member terminates adjacent the lower edge of the arched member 8 and the lower portion of the member 7 is replaced by suitable fabric or other material. The lower edge 11 of the windshield member 7 is suitably shaped to fit over the upper longitudinal member of the motorcycle frame or over other parts of the motorcycle in such a manner that there will be no interference with the required turning movement of the handle bar for steering purposes.

The arched supporting member 8 is provided near its opposite ends with bosses 12—12 which are suitably drilled to provide sockets to rotatably receive the upper end portions 13 of mounting rods 14. Said upper portions 13 are suitably threaded to receive cap nuts 15 on their upper ends and lock nuts 16 which may be adjusted toward the cap nuts 15 to clamp the rods 14 in fixed position in the bosses or lugs 12.

The lower ends of the rods 14 pass through openings in cylindrical members indicated at 17 which are slidable in sleeves such as indicated at 18. The members 17 and 18 are secured by a conventional bolt 19 to the upwardly projecting ears 20—20 of a clamp structure 21 which is adapted to be secured to any tubular frame element such as the brace member 6 or the handle bar element 4. The clamp 21 comprises opposite halves 22 and 23 which have depending ears or lugs 24—24 which are drawn together by suitable bolt and nut 25. Bolt 19 threadedly engages a suitably tapped opening in the member 17 so as to be adapted to pull the member 17 into the sleeve 18, thereby to pull the rod 14 into engagement with the outer end of the sleeve 18 and the other end of the sleeve 18 into engagement with the adjacent ear 20 of the clamp. By properly tightening the bolt 19, the mounting rod 14 is locked in position and the clamp 21 is also tightened on the frame member on which it is placed.

The mounting rods 14 are provided intermediate their ends and preferably near their upper portions 13 with angularly disposed offset portions 26. When the windshield structure is to be mounted on a braced handle bar construction as shown in Fig. 1, the mounting rods 14 are rotatably adjusted in the bosses 12 so as to position the lower portions of the rods to enter the appropriate holes in the clamps when secured to the brace member 6 as shown.

Figure 2:
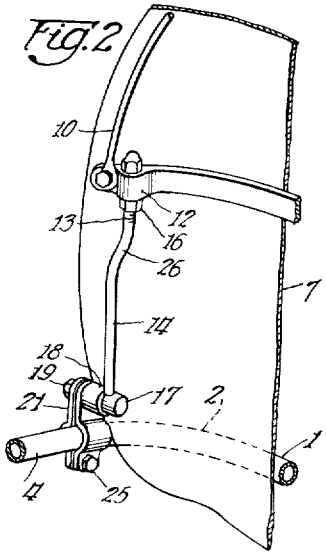
Fig. 2 is a fragmentary illustration of the manner in which the windshield is attached to an unbraced type of handle bar construction.

When the windshield structure is to be mounted on a so-called unbraced handle bar construction, the clamps 21 are positioned on the side arms 4 as shown in Fig. 2 and the mounting rods 14 are rotatably adjusted in the bosses 12 so as to assume an outwardly offset position relative to the position shown in Fig. 1 and in which outwardly offset position the lower ends of the rods will register with the appropriate openings in the clamps 21. When the mounting rods 14 are properly adjusted, the clamping or lock nuts 16 should be tightened to lock the rods 14 in their adjusted positions.

As indicated in Figs. 1 and 2, the lower portions of the rods, i. e., the portions which depend from the angular intermediate portions 26 diverge outwardly and downwardly from an extension of the axis of the upper portions 13 of said rods; that is to say, that the opposite end portions of the mounting rods are preferably not parallel but are disposed at an angle to each other. This arrangement provides the required amount of movement of the lower ends of the rods for interchangeable mounting described. It will, of course, be apparent that the clamp 21 may be so positioned on the handle bar element and that the member 17 may be rotated on its own axis to cause the hole in the member 17 to be properly aligned with the angularly disposed lower portion of the member 14.

The described arrangement is sufficiently adjustable to adapt the windshield to mounting on practically all present makes of motorcycles and it simplifies or overcomes the problems encountered by manufactures and dealers in manufacturing and handling windshield structures made specially to fit each prevailing type of handle bar construction.

Changes in the structure may be made without departing from the scope of the invention as set forth in the following claims.

I claim:

1. In a motorcycle windshield, a transparent, curved screen, a brace extending across and secured to the back of said screen adjacent the middle portion thereof intermediate its top and bottom edges, a pair of supporting rods having relatively offset upper and lower end portions, and a pair of clamps mountable on opposite side portions of a motorcycle handle bar structure, said brace being provided with a pair of bosses extending rearwardly therefrom respectively adjacent the opposite sides of said screen and each of said bosses being provided with an opening having its axis extending up and down approximately in parallel relation to the plane of said screen, each opening being adapted to rotatably adjustably receive a short upper end portion of one of said supporting rods, and said clamps each being provided with means for vertically and rotatably adjustably receiving a short lower end portion of one of said rods, major portions of the length of said supporting rods being exposed intermediate said bosses and said clamps in proximity to the back of said screen so as to be thereby protected.

2. In a motorcycle windshield, a transparent, curved screen, a brace extending across and secured to the back of said screen adjacent the middle portion thereof intermediate its top and bottom edges, a pair of supporting rods each having a short, angularly extending intermediate portion near its upper end whereby the upper and lower end portions of the rods are laterally offset relative to each other, and a pair of clamps mountable on opposite side portions of a motorcycle handle bar structure, said brace being provided with a pair of bosses extending rearwardly therefrom respectively adjacent the opposite sides of said screen and each of said bosses being provided with an opening having its axis extending up and down approximately in parallel relation to the plane of said screen, each opening being adapted to rotatably adjustably receive a short upper end portion of one of said supporting rods, and said clamps each being provided with means for vertically and rotatably adjustably receiving a short lower end portion of one of said rods, major portions of the length of said supporting rods being exposed intermediate said bosses and said clamps in proximity to the back of said screen so as to be thereby protected.

3. In a motorcycle windshield a screen, a brace extending across and secured to the back of said screen intermediate its top and bottom edges, a pair of supporting rods having relatively offset upper and lower end portions, and a pair of clamps mountable on opposite side portions of a motorcycle handle bar structure, said brace being provided with a pair of bosses extending rearwardly therefrom respectively adjacent the opposite sides of said screen and each of said bosses being provided with an opening having its axis extending up and down approximately in parallel relation to the plane of said screen, each opening being adapted to rotatably adjustably receive a short upper end portion of one of said supporting rods, the upper end portions of said rods being screw threaded and provided with nuts fitting thereon for engaging the top and bottom ends of said bosses for clamping the rods in adjusted position in said bosses, and said clamps each being provided with means for vertically and rotatably adjustably receiving a short lower end portion of one of said rods, major portions of the length of said supporting rods being exposed intermediate said bosses and said clamps in proximity to the back of said screen so as to be thereby protected.

4. In a motorcycle windshield, a one piece, transparent material screen, a brace extending across and secured to the back of said screen adjacent the middle portion thereof intermediate its top and bottom edges, a pair of supporting rods having relatively offset upper and lower end portions, and a pair of clamps mountable on opposite side portions of a motorcycle handle bar structure, said brace being provided with a pair of bosses extending rearwardly therefrom respectively adjacent the opposite sides of said screen and each of said bosses being provided with an opening having its axis extending up and down approximately in parallel relation to the plane of said screen, each opening being adapted to rotatably adjustably receive a short upper end portion of one of said supporting rods, and said clamps each being provided with means for vertically and rotatably adjustably receiving a short lower end portion of one of said rods, said screen being positioned with its lower end adjacent the normal horizontal plane of the motorcycle handle bar structure and extending upwardly to provide adequate protection for the rider of the motorcycle, major portions of the length of said supporting rods being exposed intermediate said bosses and said clamps in proximity to the back of said screen so as to be thereby protected.

5. In a motorcycle windshield a one piece, transparent material screen, a brace extending across and secured to the back of said screen adjacent the middle portion thereof intermediate its top and bottom edges, a pair of supporting rods each having a short angularly extending intermediate portion near its upper end whereby the upper and lower end portions of the rods are laterally offset relative to each other, the portions of said rods below said offset being disposed in angular relationship to the respective portions of the rods above said offsets so as to increase the offset relationship between the lower and upper ends of the respective rods, and a pair of clamps mountable on opposite side portions of a motorcycle handle bar structure, said brace being provided with a pair of bosses extending rearwardly therefrom respectively adjacent the opposite sides of said screen and each of said bosses being provided with an opening having its axis extending up and down approximately in parallel relation to the plane of said screen, each opening being adapted to rotatably adjustably receive a short upper end portion of one of said supporting rods, the upper end portions of said rods being screw threaded and provided with nuts fitting thereon for engaging the top and bottom ends of said bosses for clamping the rods in adjusted position in said bosses, and said clamps each being provided with means for vertically and rotatably adjustably receiving a short lower end portion of one of said rods, said screen being positioned with its lower end adjacent the normal horizontal plane of the motorcycle handle bar structure and extending upwardly to provide adequate protection for the rider of the motorcycle, major portions of the length of said supporting rods being exposed intermediate said bosses and said clamps in proximity to the back of said screen so as to be thereby protected.

6. In a motorcycle windshield, a transparent, transversely curved screen, a brace extending across and secured to the back of said screen adjacent the middle portion thereof intermediate its top and bottom edges, a pair of supporting rods respectively having their upper end portions secured to said brace adjacent the side edges of said screen, said supporting rods depending from said brace in inwardly spaced relation to said edges of the screen and respectively having lower end portions engageable with clamps for securing the windshield to the handle bar structure of a motorcycle, the portions of said supporting rods intermediate said brace and said lower end portions being free of said screen and exposed but located in proximity to the back of said screen, the latter extending downwardly from said brace for substantially the entire lengths of said exposed supporting rod portions so as to thereby protect the same, said screen being of substantially self supporting rigidity and being supported from the handle bar structure mainly by said supporting rods and brace.

7. In a motorcycle windshield, a transparent, transversely curved screen, a brace extending across and secured to the back of said screen adjacent the middle portion thereof intermediate its top and bottom edges, a pair of supporting rods respectively having their upper end portions secured to said brace adjacent the side edges of said screen, said supporting rods depending from said brace in inwardly spaced relation to said edges of the screen and respectively having lower end portions engageable with clamps for securing the windshield to the handle bar structure of a motorcycle, the portions of said supporting rods intermediate said brace and said lower end portions being free of said screeen and exposed but located in proximity to the back of and thereby protected by said screen, said screen extending downwardly from said brace to adjacent the plane of the level of the top frame bar of a motorcycle to which the windshield is attached and having its lower marginal portion centrally recessed to receive said top frame bar so as to avoid interference by said frame bar with turning movement of the handle bar for steering purposes, said screen being of substantially self supporting rigidity and being supported from the handle bar structure mainly by said supporting rods and brace.

8. In a motorcycle windshield, a transparent, transversely curved screen, a brace extending across and secured to the back of said screen adjacent the middle portion thereof intermediate its top and bottom edges, a pair of supporting rods respectively having relatively axially offset upper and lower end portions and their upper end portions secured to said brace adjacent the side edges of said screen, said offset relationship of the upper and lower end portions of said supporting rods serving to permit mounting of the rods at their upper ends as aforesaid with their lower ends located in selected position within an arcuate range about a prolongation of the axes of their upper ends, said supporting rods depending from said brace in inwardly spaced relation to said edges of the screen and respectively having lower end portions engageable with clamps for securing the windshield to the handle bar structure of a motorcycle, the portions of said supporting rods intermediate said brace and said lower end portions being free of said screen and exposed but located in proximity to the back of and thereby protected by said screen, the latter extending downwardly from said brace for substantially the entire lengths of said exposed supporting rod portions so as to thereby protect the same, said screen being of substantially self supporting rigidity and being supported from the handle bar structure mainly by said supporting rods and brace.

9. In a motorcycle windshield, a transparent, transversely curved screen, a brace extending across and secured to the back of said screen adjacent the middle portion thereof intermediate its top and bottom edges, a pair of sockets on the back of said brace in inwardly spaced relation to the side edges of said screen, a pair of supporting rods respectively having relatively axially offset upper and lower end portions, the upper end portions of said rods being secured in said sockets, said offset relationship of the upper and lower end portions of said supporting rods serving to permit mounting of the rods at their upper ends as aforesaid with their lower ends located in selected position within an arcuate range about a prolongation of the axes of their upper ends, said supporting rods depending from said sockets in inwardly spaced relation to said edges of said screen and respectively having their lower end portions engageable with clamps for securing the windshield to the handle bar structure of a motorcycle, the portions of said supporting rods intermediate said brace and said lower end portions being free of said screen exposed but located in proximity to the back of said screen, the latter extending downwardly from said brace for substantially the entire length of said exposed supporting rod portions so as to thereby protect the same, said screen being of substantially self supporting rigidity and being supported from the handle bar structure mainly by said supporting rods and brace.

ANTHONY THOMAS COMISKEY, SR.

REFERENCES CITED

The following references are of record in the file of this patent:

UNITED STATES PATENTS

| Number | Name | Date |
|---|---|---|
| 1,239,916 | Jose | Sept. 11, 1917 |
| 1,360,945 | Harley | Nov. 30, 1920 |
| 1,387,349 | Campbell | Aug. 9, 1921 |
| 1,532,008 | Walford | Mar. 31, 1925 |
| 1,729,086 | Premont | Sept 24, 1929 |
| 2,237,594 | Dunlap | Apr. 8, 1941 |

FOREIGN PATENTS

| Number | Country | Date |
|---|---|---|
| 254,850 | Great Britain | July 15, 1926 |

Certificate of Correction

Reissue No. 23,039. September 21, 1948.

ANTHONY THOMAS COMISKEY, SR.

It is hereby certified that errors appear in the printed specification of the above numbered patent requirng correction as follows:

Column 2, line 6, for the word "transverse" read *transparent*; column 3, line 48 for "manufactures" read *manufacturers*; column 7, line 11, claim 9, after "screen" insert *and*;

and that the said Letters Patent should be read with these corrections therein that the same may conform to the record of the case in the Patent Office.

Signed and sealed this 18th day of January, A. D. 1949.

[SEAL]

THOMAS F. MURPHY,
*Assistant Commissioner of Patents.*